March 31, 1970    A. E. MOORE    3,503,825
METHOD OF MAKING LIGHT-WEIGHT ARTICLE
Filed March 3, 1966
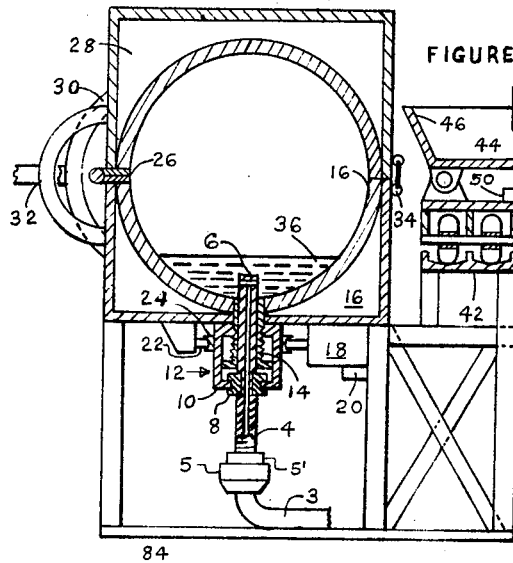
ALVIN EDWARD MOORE,
INVENTOR.
BY
*Alvin E. Moore,*
ATTORNEY.

United States Patent Office 3,503,825
Patented Mar. 31, 1970

3,503,825
METHOD OF MAKING LIGHT-WEIGHT ARTICLES
Alvin Edward Moore, 916 Beach Blvd.,
Waveland, Miss. 39576
Filed Mar. 3, 1966, Ser. No. 531,564
Int. Cl. B22d 27/14; B29d 3/00
U.S. Cl. 156—245                                32 Claims

ABSTRACT OF THE DISCLOSURE

A method of making sealed, hollow, gas-containing plastic or metal articles, having especially important use in the manufacture of such articles of dense materials of high melting points—for example, aluminum, copper or glass. Molten material, collected around the head of a blowing tube, is gas-blown into a plastic bubble and forced off the tube and into a cooled mold or chamber which may contain a mold. Preferably the gas is lighter than air, and the consequent buoyancy of the bubble aids in discharging it from the tube and into the cooling receptacle. The quick cooling adds strength to the thin walls.

---

This invention pertains to light-weight, hollow, gas-containing articles and methods and apparatus for their manufacture.

There is a strongly felt need in many industrial fields for such light-weight, hollow objects—both those that are lighter-than-air and those which constitute strong, light-weight but slightly heavier-than-air structures that are either final products or construction units used in making final products. These fields include: land, water, air and space vessels (in the structure of their vehicles and/or to provide lift); life buoys or preservers (for use on the water or in the air); wheel tires; light-weight electric or other cables (buoyant or carried in transportation vehicles); light-weight furniture for use on vehicles or for ease of their being moved; toys; balls; swim sleds; water skis; and the like.

Accordingly, it is an object of the present invention to provide a method of manufacturing hollow, gas-filled, light-weight articles.

A further object is to present a method for blowing light-weight, hollow, gas-containing, hermetically-sealed articles from masses of plasticized materials by the insertion of pressurized gas into the plastic masses.

Another purpose is to provide a method for blowing light-weight, hollow, gas-containing, hermetically-sealed articles from masses of plasticized materials by the insertion of lighter-than-air gas into the plastic masses.

A further objective is to provide a method for the making of very light-weight, very flexible but strong articles which resist fracture or deformation.

Another purpose is to provide a method of blowing and molding a hollow article from fluent material in a mold that has a gas-injection aperture, comprising moving a gas-injecting part of a gas-blowing tube, having an imperforate free end, from a position in an opening thru the mold in which the imperforate end seals the mold to a position for gas injection, supplying gas laterally from the axis of the tube into the mass of fluent material, blowing the material into shaping contact with the inner surface of the mold, and withdrawing the tube until its inner end again seals the opening.

The foregoing and other objects will become more fully apparent from the following detailed description of several forms of the invention and from the accompanying drawings. For clarity of illustration, the showing in these drawings of the protective envelopes of very flexible material is hatched to indicate synthetic rubber or other plastic; but in practice some of these sheaths may be reinforced with fibrous or metallic fabric or mesh. This fabric may be, for example, of springy plastic or spring metal (spring steel or resilient phosphor-bronze).

FIGURE 1 is an elevational, sectional view from a vertical plane that passes thru the center of a mold, illustrating one form of the apparatus of this invention.

FIGURE 1A is a detail, sectional view of an alternative form of gas-blowing tube.

FIGURE 2 is an elevational view, partly in vertical section and broken away, of another form of the invented apparatus.

FIGURE 3 is an elevational, sectional view from a vertical plane thru the center of a mold and of a gas-blowing head, partly broken away, showing a third form of the invented apparatus.

FIGURE 4 is a sectional view from a vertical plane thru one of the articles (for example, a balloon, ball, toy or buoyant cable) that may be made by the apparatus and methods of this invention.

FIGURE 5 is a sectional view from a vertical plane thru another of the articles that may be made by this invention.

FIGURE 5A is an end elevational view of one form of the object of FIGURE 5.

FIGURE 6 is a sectional view from a vertical plane thru another of the articles that may be made by the present invention.

FIGURE 7 is a sectional view from a plane thru a vehicle deck or wall (or alternatively thru a floating or other mattress, or other similar article) that may be made by the methods and/or apparatus of this invention.

FIGURE 7A is an elevational, sectional view from a vertical plane normal to the longitudinal axis of a swim sled or life preserving device, constructed of gas-filled articles.

FIGURE 8 is a plan view of another type of article (for example, a marine life preserver, an aviator's life raft or a boat or other vehicle) that may be made by the invention.

An article of manufacture that is the product of this invention may comprise a light-weight, hollow, gas-filled container (for example the recepacle shown in FIGURE 4 at 1) and a flexible cover on the receptacle (for instance, the envelope 2 of FIGURE 4). The invented article also comprises the gas-blown unit, which may enter commerce without a flexible cover and be used as such, or later may be placed in a flexible envelope to complete a produce of the invention as a more complex combination.

FIGURES 1 to 3 illustrate three types of apparatus as aids in carrying out the basic gas-blowing method. In FIGURE 1 pressurized gas (for example, helium, ammonia, hydrogen mixed with explosion-preventing non-combustible gas, or air) is supplied from a flexible conduit 3, which is preferably made of rubber-and-fabric or other reinforced plastic and has a valve that is manually or automatically controlled. It is schematically shown in FIGURE 1; in practice, it is coiled, jointed or otherwise adapted to easily permit verical reciprocation of gas-blowing tube 4 and of the detachable connection 5 between the tube and conduit; and in practice this connection is placed directly under element 8, so that there is a longer, curved loop of the flexible conduit between element 8 and the floor.

Alternatively, connection 5 is not screwthreaded on tube 4 as shown, but instead is a sealed slip joint, of the type shown in FIGURE 1A, between conduit 3 and tube 4. In this event, the lower part of tube 4 (the part that is below element 8) is made of a larger diameter than the upper part of the tube, and this large-diameter portion, having a free lower end, may reciprocate by sliding on an upward extension of part 5' of connection 5. As shown in FIGURE 1A, this upper extension then is of smaller diameter than part 5' in FIGURE 1, and has, between it and the lower end of the blowing tube, a seal (7) against escape of gas. This type of telescoping slip-joint optionally may be incorporated also in the blowing tube of FIGURE 2 or FIGURE 3; preferably it is used only when the gas uitlized is helium under a pressure sufficiently low to avoid blowout of gas at seal 7.

Blowing tube 4, preferably made of metal, has a vertical channel that is in flow communication with conduit 3 and with short, horizontal passages that extend laterally of the tube, adjacent its imperforate upper end or cover, 6. On the middle part of the blowing tube there is fixed (by welding or the like) an element 8 which has an annular recess in its outer periphery; and in this recess the lower apertured disk 10 or rotary and reciprocating member 12 may rotate. Member 12 also has an upper apertured disk, and in its inner periphery there are screw threads which fit on male screw threads of hollow stud 14. This stud is welded or otherwise sealingly bonded to the wall of a hole in the lower half 16 of a mold. The upper end of the tubular stud is shaped to conform to the adjacent curvature of the mold, and its lower end is a disk which acts as a stop for the downward movement of the screwthreaded upper disk of member 12.

The vertical reciprocation of this member (and of blowing tube 4 to which it is attached) occurs when member 12 is rotated in either direction, by hand, or (preferably) by actuation of a reversible electric or fluid motor 18, under the control of an automatic switch in control box 20. When the motor turns it rotates worm shaft 22, and this drives worm wheel 24, which is fixed to rotary element 12.

The mold, which may be cylindrical, spherical or any other desired shape, comprises an upper half that may be pivoted upward relative to the lower half 16 on hinge 26. Both of the halves have chambers 28 thru which cooling and/or heating fluids may be conducted via conduits 30 and 32. At least the parts of these conduits that are connected to the hinged upper half of the mold are flexible, adapted to permit hinging of this half without damaging deformation; and preferably all the illustrated parts of the conduits that are adjacent the mold are of heat-resistant rubber-and-fabric or other reinforced plastic. In some shapes of the mold (for example a spherical shape) chambers 28 are in flow communication with each other.

When the molt is closed and the resiliently-clamping hook and eye 34 (or ot her, similar attachments) are fastened, its lower part is adapted to contain a pasty, plasticized material, 36, (for example, heat-softened plastic, aluminum or glass); and its gas-injection hole is then closed by reciprocation in a direction away from the mold's center of the blowing tube until the lateral gas-injection passages are closed by the walls of the hole, with the imperforate end 6 of the tube conforming to the adjacent part of the inner surface of the mold. (Optionally, the axis of the blowing tube may be inclined to the vertical; the criterion of this aspect of the invention is the positioning of the lateral gas-injection passages in the lower part of the mold and below the surface of the mass of material—preferably in the lower portion of the mass.)

The material 36 is conducted to the mold under manual or automatic control, for example, via conduit 38, shown in FIGURE 2, and the flow-control valve and measuring, dispensing device 40 (actuated by solenoid, fluid-moved diaphragm or by hand), or it is conducted by the structure indicated in the right-hand part of FIGURE 1. This structure comprises a car having wheels that roll on tracks 42 between a melting furnace and the mold shown in FIGURE 1, or a plurality of such molds. On the underframe of the car a liquid holder 44 is mounted. As illustrated, this holder is pivoted on the underframe and has an inclined, spout-like wall 46. When the car is opposite the opened mold (which may be coated with a substance to prevent material 36 from sticking to it), the holder 44 is pivoted by reversible electric or fluid motor 48, and liquid in a predetermined amount is dumped into the lower half of the mold. Motor 48 is controlled from control box 50 by the manually or automatically operated switch or valve in the box. The motor is connected to the holder by: rotatable, screwthreaded shaft 52 (free to turn relative to looped element 54); nut 56; and bolt or clevis 58 that is rigidly connected to nut 56. Element 54 is braced and welded or otherwise rigidly attached to holder 44.

Alternatively, the holder may be rigidly mounted on the underframe, and a flexible or telescoped liquid-supplying tube is actuated by the motor until its free end is over the mold's lower part, and a measured amount of the liquid is dispensed to the mold via a dispensing device of the type indicated at 40.

If the liquid that is placed in the mold is molten aluminum or other plasticized material which must become rather viscously pasty before it is coherent enough to be blown into a hollow article, it is allowed to cool until it is in this condition. If desired, a thermometer or viscometer may be placed in the lower part of the mold for indicating (by sight or electric or fluid signal) when the mass is in this condition. If the case of glass and some plastics little or no cooling before blowing is necessary; in fact, if the mold is cold at the beginning of the process, it is heated in some instances—by circulation of heating fluid thru one of the sets of conduits, 30 and 32 and the chamber or chambers 28.

When the material has substantially the desired degree of viscosity the upper end of blowing tube 4 is moved into the mass, the valve in conduit 3 is manually or automatically opened, and gas under the desired pressure is injected into the pasty mass 36. Then control 20 is again manually or automatically actuated, thus energizing motor 18 to turn it in a direction to withdraw the head of the injection tube until member 12 is stopped by the disk on 14 and the upper surface of 6 conforms to the adjacent part of the mold's inner surface.

At this time the pasty mass 36 has been blown into a gas-inclosing wall, contacting the inner surface of the mold. Then to hasten solidification, if quick removal of the object is desired, cooling fluid is circulated thru chamber or chambers 28. After the pasty mass has solidified the mold is opened and the blown article is taken out.

In FIGURE 2, the article-blowing method is illustrated as being carried out with the aid of a pivoted blowing tube, 60, which is supplied with gas from control valve 61, which may be manually or automatically operated. Especially when the gas used is lighter than air the blowing head 62, as illustrated, is preferably above the remainder of the tube, and above the pressurized-gas tank 64 and the receptacle 66, in which the mass of pasty material is deposited for pickup by the blowing head. But optionally the pivoted tank 64 and tube 60 or else the receptacle 66 and its liquid supply means are mounted on wheels and tracks of the type shown in FIGURE 1, so that after pivoting and dipping head 62 into and out of the pasty material it may be moved into position over and into an open-top lower mold (of the general type of mold 68 in FIGURE 3, inverted from its FIGURE 3 position).

Receptacle 66 is a trough in a position beneath the blowing tube and long enough and/or sufficiently curved in a vertical plane thru its long axis to permit blowing head 62 to clear the adjacent end of the trough when it is pivoted into and out of the material in the trough. This pivoting is accomplished by means of crank 69, which may be turned manually or by a motor.

As shown in FIGURE 2 the article material, in liquid form, may be brought to the apparatus in conduit 38 and dispensed into the trough by measuring and dispensing device 40, which may be manually or automatically controlled. Alternatively, the liquid may be brought to the blowing structure by a car on rails of the type shown in FIGURE 1, and a measured amount of it dumped into hopper or funnel 70.

Tank 64 is kept filled with pressurized gas by means of connection 72. This may comprise an inflation valve, 73, which is connected with a source of gas under pressure, or it may be simply a screwthreaded connection, to which a flexible conduit such as 3 of FIGURE 1, may be attached, together with its manually or automatically controlled valve.

If a blowing gas comprising hydrogen is used in carrying out any of the herein disclosed methods, at least the upper part of the blowing tube which comprises a lateral passage or passages to the tube's exterior is housed in a chamber that, before said blowing operation, confines an ambient gas which does not support combustion. With the use of the apparatus of FIGURE 2 or FIGURE 3, this chamber may be a large receptacle or room; and in it the operator of the apparatus may wear a mask and an air-supplying device for breathing. Alternatively, in the automatic performance of the method, no mask is necessary. With the apparatus of FIGURE 1, the ambient non-combustible gas is within the mold at the beginning of the blowing operation; and as the bubble is blown it escapes thru the minute cracks between the two mold halves.

As illustrated in FIGURE 2, and for use in connection with the blowing of lighter-than-air articles, the apparatus may comprise an upper cooling chamber 74, into which the blown, thin-walled bubble floats after its lifting force moves it off the pear-shaped blowing head. The chamber may be high enough and/or cooled enough to permit the bubble to solidify into a globe before it strikes the ceiling of the chamber. Or, optionally, it may have a lower ceiling, of a height calculated to cause the still plastic bubble to strike the ceiling and be somewhat flattened or otherwise shaped in its upper surface before it solidifies.

Optionally, mold 68 may be fixed to the chamber's ceiling in position to catch the upward floating bubble and form its upper portion; this change would be of aid in blowing a single article into the cooling receptacle, with the receptacle being moved or the article taken out before blowing another object.

The chamber preferably has a trapdoor, 76, which is opened and closed by motor 78, under the automatic control 80 or, optionally, of the manual control switch or valve 82. The door may be opened just before the first bubble is blown and closed shortly after the last of a series has floated into the high cooling chamber.

This cooled chamber 74 and its opening by operation of its door 76 are somewhat similar in purpose to the upper cooled compartment of the mold of FIGURE 1 (shown below numeral 28 and above numeral 36) and its opening by hinging upward the upper half of the mold. Both cooled receptacles are opened to permit entry of article material (in FIGURE 1 the molten material and in FIGURE 2 the final material of the article).

In FIGURE 3 the cooling chamber is eleminated and a succession of molds 68, each depending from a rod, 84, is rail-wheeled over the pivoted (or pivoted and telescoped) blowing tube 86.

Articles of many shapes and uses may be blown by the above-described methods and apparatuses. In some of the articles, that are to contribute considerable strength in the final product in which they are to be incorporated, their blown walls are relatively thick—for example of one-twentieth to one-fourth of an inch, and their inclosed gas is preferably under a pressure well above that of the atmosphere (for example at 18 to 30 pounds per square inch). But in others, where especial lightness of weight or lifting force is desired, the walls of the containers may be as thin as .0012" to .006", and their gas is at a pressure below or only slightly above that of the atmosphere. This low pressure may be obtained by heating the gas before it is injected into the heat-softened mass of material to be blown. Then after the blown article and its inclosed gas are cooled, the gas pressure is reduced, to below or slightly above that of the atmosphere. One way of heating the gas for this purpose is by means of electric or fluid heating coils, such as are shown at 88 in FIGURE 2. The subatmospheric pressure is preferably used within walls of rigid or semi-rigid material, such as this type of plastic or glass.

One of the principal basic uses of these blown objects—especially when they are made with thin walls of frangible or easily-deformable materials—is in an outer envelope or sheath of protective, resilient and highly flexible material, such as foam rubber or other flexible plastic that is porous. A few of the articles with flexible coats that may be made in the more complex aspect o fthe invention are shown in FIGURES 4 to 8.

FIGURE 4 may be considered as a cross-sectional view of a sphere or cylinder from a plane thru: a volley, tennis, beach or other ball; a toy, advertising, or vehicle-lifting balloon; a buoyant or electric or other cable; or a construction unit in light-weight structures. If the article is an electric cable, the blown element 1 is a thin, elongated, aluminum (or possibly copper) receptacle, containing gas which is preferably helium or a gas mixture comprising hydrogen and a small amount of combustion-inhibiting gas.

Element 1 is placed in an envelope 2, which is illustrated as comprising porous, flexible rubber or other plastic, but which optionally may be of other very flexible, solid plastic. In the case of an electric cable a plurality of the elements 1 may be shaped like the blown article 90 of FIGURE 5; and they are held in close, permanent, but flexible contact within a long, open-ended, waterproofed sheath, preferably comprising rubber and fabric. In the case of a ball, balloon or construction unit the envelope may be rounded as shown at the round ends of sheath 92.

In the coated articles the resiliently flexible material of the envelope preferably does not adhere to the surface of the blown article. This freedom of relative movement between the blown unit and its coat may be obtained by forming the envelope away from the unit and then inserting the blown article in the sheath. Another way of obtaining this free movement is to coat the blown unit with talcum or the like, place it in a mold, and then form the foam rubber or other plastic sheath about the unit as a core. If rubber is thus used it preferably is cold-vulcanized.

FIGURE 5 may be considered as a sectional view of a hollow pad (having flat top and bottom surfaces), or a round-ended cylinder, or an elongated article of square cross section (illustrated in FIGURE 5A).

FIGURE 6 is a sectional view of a doughnut-shaped article, for example a wheel tire, lifebuoy, balloon, toy, construction unit for forming the frame of vehicle walls, or the like.

The blown article, 94, is placed in sheath 95 of resilient plastic, which in some uses—for example as a vehicle tire—is relatively thick adjacent the outer periphery and side walls of the blown unit, and may be bonded to this unit. It may be formed away from and then glued to the gas unit, or it may be molded about the unit as a core. If desired, a layer of the porous plastic may be formed also on the inner periphery of the doughnut-shaped object, and inside this layer a central, hollow, gas-blown disk may be mounted. Alternatively, an integral, hollow, gas-filled disk may occupy all the space within the doughnut-shaped envelope of resilient plastic. In the case of a vehicle tire, the envelope's outer surface is covered with a wear-resistant tread.

In making vehicle walls, decks and/or top covers or overhangs of the type shown in FIGURE 7, the envelope is preferably of a relative thickness that is considerably reduced from that shown in FIGURE 6; or it is replaced by small pieces of foam plastic between adjacent portions of the peripheries of the gas units, which bear against each other thru these pieces; or, as illustrated in the horizontal cross-sectional view of FIGURE 7, the blown article 96 may be made of tough, springy plastic and bear directly against each other, thus resiliently tightening and smoothing an outer, waterproofed skin. This skin tightly incloses all the resilient, doughnut-shaped article (whether or not they are plastic-buffered) and slightly flattens their contacting peripheries. It may be made of flexible plastic, impregnating and covering a mesh or other fabric of fibrous or metallic material. This fabric may be, for instance, of nylon or be a wire mesh of copper, aluminum, spring steel, resilient phosphor-bronze or springy plastic; and its impregnating material may be rubber or other plastic mixed with fibrous or metallic filaments (for example, asbestos fibers), sawdust or fine sand.

The flat-sided, round-edged object shown in FIGURE 7 may be used as a raft or surf board or (when narrower) as the major portion of a water ski or swim sled; and it may have an upturned curve of fabric-and-plastic sheathed resilient foam rubber or other plastic at its nose or bow. A boat (or other vehicle) also may be made of a plurality of these flat-sided objects as construction units, with two of ther horizontally positioned (as shown in FIGURE 7) for the top and bottom of the boat, and a cabin formed between them by two other sidewall units that are vertically positioned and fixed at their top and bottom edges to edges of the horizontal units. These sidewall units and the top unit are either made of unstaggered gas-containing articles (forming a rectangle instead of the shape shown in FIGURE 7); or (and preferably) the lower rows of gas-filled articles, 96', on each side of the vehicle, mainly project below the vehicle deck or floor and thus become catamaran floats or supports for wheels or other landing devices. Preferably the doughnut-shaped articles of at least the sidewalls and top of such a vehicle are filled with lighter-than-air gas, and preferably there is a balloon of the type illustrated in FIGURE 5 on each side of the cabin's center gangway, floating against and exerting a lift on the vehicle's top adjacent each sidewall, and there are foam-plastic-buffered gas-blown disks, containing lighter-than-air gas, of the type described in connection with FIGURE 6, within the center spaces of the doughnut-shaped gas units of the sidewalls and top. The bow and stern comprise transparent windows.

FIGURE 7A illustrates one type of construction of a swim sled or life-preserving device. Within an outer, waterproofed skin there are: a single deck row of doughnut-shaped units, 97, containing lighter-than-air gas; and two side rows of such units, 98, each of which may be, of larger volume than one of the units 97. The sled or preserver thus has a stabilizing center of aerostatic lift that is considerably above the vehicle's center of gravity, even when a user is lying or sitting on the deck row.

When the user is swimming or rowing his hands or oars project thru opposite openings in the skin and thru two of the center spaces of the doughnut-shaped units. The other center spaces preferably contain hollow disks, filled with light-than-air gas.

In FIGURE 8 another type of a marine life preserver, aviator's life raft, boat or other vehicle is shown. Its simplest form comprises a pair of curved, gas-filled, hermetically-sealed, tube-like units, preferably containing lighter-than-air gas, which are bonded together with the interposition of a disk 99 between each pair of the juxtaposed tube ends. The outer surfaces of these tubes are sheathed in a glued waterproofed skin of the above-described type, and this skin also goes across from the bottom of one tube to the opposite tube, thus forming a deck for the craft. Optionally, two or more pairs of the end-bonded tubes may be vertically stacked, to form a craft of higher sidewalls; and a flevixle foam-plastic pad, coated with non-porous waterproofing may be laid on the deck skin, within the craft.

In the claims, the word gas is used to mean any pure gas or gaseous mixture.

I claim:

1. A method of making an hermetically-sealed hollow article of thermoplastic material comprising the following steps:
    (1) inserting a gas-supplying blowing tube into a heated, plastic mass of said material while the mass is within ambient gas;
    (2) supplying, thru a passage opening to the exterior of an end portion of said tube, a lighter-than-air blowing gas under pressure into said mass, thus forming a gas-containing hollow space in the mass;
    (3) moving said blowing tube until said end portion and said mass are above the other end portion of the tube, and allowing said mass while it is still in viscously-flowing condition to float freely off and above the tube; and
    (4) supplying sufficient free space and ambient-gas coolness above said first-named end portion to cause said mass to cool and solidify substantially to a predetermined extent before it contacts any solid object.

2. A method as set forth in claim 1, in which said blowing gas is helium.

3. A method as set forth in claim 1, in which said blowing gas comprises hydrogen, and in which said ambient gas does not support combustion and, during steps, (1) (2) and (3), prevents contact of air with said mass.

4. A method as set forth in claim 1, in which said step (2) comprises heating said blowing gas.

5. A method as set forth in claim 1, in which the pressure of said blowing gas in said gas-containing hollow space is above the pressure of said ambient gas when the blowing gas is inserted into said mass, but is below said ambient-gas pressure after said article has been cooled and solidified, and in which said material when cooled and solidified is sufficiently rigid to prevent damaging deformation of said article due to the difference between said two pressures.

6. A method as set forth in claim 1, in which said blowing gas comprises hydrogen and said ambient gas inhibits combustion.

7. A method as set forth in claim 1, in which said material is aluminum.

8. A method as set forth in claim 1, in which said material is substantially impermeable to gas and which further comprises a step (5), of attaching to said solidified article a jacketing element of plastic.

9. A method of making a hollow, sealed article, comprising the following steps:
    (1) conducting a relatively large amount of article-forming material into proximity to a fluent-material holder;
    (2) supplying into said holder from said amount a relatively smaller quantity of the said material in a fluent, formless state;
    (3) moving the apertured, free-ended portion of a gas-blowing tube into said quantity, closely surrounding said apertured tube portion by a separate mass of the fluent, formless material, in the approximate amount necessary to form the shell of said hollow article, separated from contact with other fluent, article-forming material, and placing said apertured portion into gas-blowing position with its free end above the rest of the said portion;
    (4) operating a valve for supplying pressurized blowing gas thru the said apertured portion and into the interior of said separate mass of fluent material, and blowing the entire amount of said mass into a sealed bubble that is out of contact with any other amount of said fluent material, with its bottom part penetrated by the sidewalls of said apertured tube portion;

(5) continuing to blow pressurized gas into the bubble until it is separated from the said sidewalls with aid of the pressure of gas in the bubble, with simultaneous sealing of the bubble in substantially the final form of said article; and (6) solidifying the fluent material of the gas-containing shell of said article.

10. A method as set forth in claim 9, in which said article forming material is glass.

11. A method as set forth in claim 9, in which said blowing gas is lighter than air.

12. A method as set forth in claim 9, in which said blowing gas comprises hydrogen, and in which said method further comprises the step of covering said separate mass with an ambient gas that does not support combustion.

13. A method as set forth in claim 9, in which the blowing gas is non-combustible, said method further comprising heating said gas before it is injected into the plastic mass in step (4).

14. A method as set forth in claim 9, in which said material comprises copper and said blowing gas is helium.

15. A method as set forth in claim 9, in which: the said fluent material is pasty and coherent; and said step (3) comprises downward pivoting of said apertured tube portion into said quantity, coating said portion with a film of said coherent, pasty material, and upward pivoting of the film-coated apertured portion until its axis is upright; and said step (4) comprises continuing to supply said pressurized gas, after formation of said bubble, until the bubble is forced entirely off the upper free end of said tube.

16. A method as set forth in claim 9, in which: in the said blowing position of step (3) the axis of said apertured portion is upright; and in said step (4) at least part of said pressurized gas that is blown into said mass is supplied laterally of the said axis.

17. A method as set forth in claim 9, in which: the said holder is a mold; in the said blowing position of step (3), the axis of said apertured portion is upright; in step (4), the said free end is imperforate, all of said pressurized gas that is blown into said mass is supplied thru the sidewalls of said apertured portion, and the movement of said portion comprises its upward reciprocation from a position in which said imperforate free end seals a lower, gas-injection hole in said holder and into an upper gas-blowing position, in which said gas is blown into the mass thru said sidewalls; and said step (5) comprises downward reciprocation in said hole of said apertured portion, into position sealing the hole by said imperforate end, and covering the hole and imperforate end by an integral portion of the still fluent material of the gas-containing shell of said article.

18. A method as set forth in claim 9, in which said step (3) comprises telescopically sliding said apertured, free-ended portion with respect to another part of said gas-blowing tube, thus lengthening the tube in its gas-blowing position.

19. A method as set forth in claim 9, in which step (1) comprises moving said article-forming material, in fluent condition, thru a conduit into said proximity, and step (2) comprises dispensing a measured amount of the material into said holder.

20. A method as set forth in claim 9, in which: said article-forming material is thermoplastic; the method further comprises the step of heating said article-forming material before blowing said bubble in step (4); the normal-temperature weight of the blowing gas of step (4) is not greater than that of air; and, in said step (5), the heat-lessened weight of the blowing gas in the hot bubble is utilized as a lifting force, aiding in separating the bubble from the said sidewalls.

21. A method as set forth in claim 9, in which step (1) comprises heating material that is normally in a solid state and wheeling it, while it is in heated, fluent condition, to the mold.

22. A method as set forth in claim 9, further comprising a step of jacketing said solidified article with material comprising plastic.

23. A method as set forth in claim 9, in which said article forming material comprises aluminum.

24. A method as set forth in claim 23, in which said blowing gas is helium.

25. A method of making a sealed, hollow, gas-containing article having walls of a metal which becomes coherently plastic in changing between solid and liquid states, comprising the following steps:

(1) supplying into a receptacle that is upwardly open an amount of said material in its molten state;

(2) while the material is in its coherently plastic state, downwardly pivoting into it on a predetermined and fixed arc the apertured head of a blowing tube that is connected to a valved source of pressurized lighter-than-air gas, the arc of said pivoting having a radius that is short enough to permit the apertured head to clear the wall of said receptacle in its downward swing;

(3) upwardly pivoting the apertured head, loaded with a lump of said plastic-state material that adheres to surfaces of the head, out of the confines of the receptacle;

(4) operating a valve to supply lighter-than-air blowing gas thru said tube and its head into the interior of said lump, thus gradually forcing the lump off the head;

(5) catching said bubble in a mold which is open toward the apertured head in its position in which the bubble is forced off the head; and (6) after the bubble wall material has solidified, removing the article from the mold.

26. A method as set forth in claim 25, in which said mold is above said apertured head in its position in which the bubble is forced off the head.

27. A method as set forth in claim 26, in which: an upper part of the plastic bubble is shaped by the surface of the open mold; the mold is positioned in a chamber that opens downward toward the apertured head in its position in which the bubble is forced off it; the combined weight of the bubble wall material and its inclosed gas is less than the weight of the bubble's volume in the ambient gas around the apertured head and in said chamber, thus causing the bubble to float against the said mold surface; and in which said method comprises the step of cooling the ambient gas in the chamber.

28. A method as set forth in claim 27, in which said blowing gas comprises hydrogen and said ambient gas does not support combustion.

29. A method as set forth in claim 28, in which said metal comprises aluminum and said blowing gas is helium.

30. A method of blowing and molding a sealed, hollow, gas-containing article from fluent material in a multiple-part mold, comprising the following steps:

(1) placing a predetermined quantity of fluent, article-forming, molding material, capable of setting into solid-material condition, in a lower part of the multiple-part mold;

(2) closing and securely fastening the mold and sealing the parts of the mold against escape of molding material during the molding process;

(3) moving an apertured, gas-supplying, tubular element, having an imperforate free end, from a position in an opening of the mold in which the said imperforate end seals the mold to a position for gas injection;

(4) supplying gas laterally from a fluid conduit of said apertured element to its sidewalls and into the mass of fluent material;

(5) blowing the material into shaping, mold-conforming contact with the inner surface of the mold;
(6) withdrawing the said apertured element until its imperforate end again seals the opening of the mold and causes the molding material to flow together to seal the area through which said apertured element had projected; and
(7) solidifying said fluent material.

31. A method as set forth in claim 30, wherein said article forming material is initially heated to change it from a solid state into a fluid, coherently-plastic state, and in which said step (7) comprises cooling said mold by supplying cooling fluid in contact with it.

32. A method as set forth in claim 30, in which step (1) comprises: opening a movable part of said mold; conducting molding material into close proximity to the mold; and supplying said predetermined quantity into the mold.

References Cited

UNITED STATES PATENTS

| | | | |
|---|---|---|---|
| 1,614,853 | 1/1927 | Schwartz | 264—45 X |
| 2,226,504 | 12/1940 | Rowe | 65—73 |
| 2,501,833 | 3/1950 | Webb et al. | 264—96 |
| 2,812,551 | 11/1957 | Chupa | 264—96 |
| 2,838,798 | 6/1958 | Rekettye | 264—96 |
| 2,850,026 | 9/1958 | Leatherman | 52—2 |
| 2,961,116 | 11/1960 | Jeppson. | |
| 2,981,984 | 5/1961 | Orr | 264—45 |
| 2,994,108 | 8/1961 | Bjorksten | 264—94 |
| 3,054,615 | 9/1962 | Budish. | |
| 3,067,352 | 12/1962 | Vodicka et al. | 313—116 |
| 3,095,260 | 6/1963 | Ferriot | 264—94 X |
| 3,125,377 | 3/1964 | Bridges | 297—462 |
| 3,282,533 | 11/1966 | Spain | 52—2 X |
| 3,342,248 | 9/1967 | Bonis et al. | 164—77 X |
| 3,358,062 | 12/1967 | Lemelson | 264—96 |

OTHER REFERENCES 797,767 7/1958 Great Britain.
667,419 1/1964 Canada.

ROBERT F. WHITE, Primary Examiner
T. J. CARVIS, Jr., Assistant Examiner

U.S. Cl. X.R.

18—5; 65—17; 164—119, 306; 264—45, 85, 96, 100